US008681804B2

(12) United States Patent
Greene et al.

(10) Patent No.: US 8,681,804 B2
(45) Date of Patent: Mar. 25, 2014

(54) METHOD AND APPARATUS FOR PERSISTENT COMMUNICATIONS, INTEROPERABILITY AND SITUATIONAL AWARENESS IN THE AFTERMATH OF A DISASTER

(75) Inventors: Michael F. Greene, Amherst, NH (US);
William J. Delaney, Bedford, NH (US);
Kristin A. Spang, Nashua, NH (US);
Mark E. Kimbark, Derry, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 12/423,062

(22) Filed: Apr. 14, 2009

(65) Prior Publication Data

US 2009/0196234 A1    Aug. 6, 2009

Related U.S. Application Data

(63) Continuation of application No. 10/585,148, filed as application No. PCT/US2005/040876 on Nov. 10, 2005, now Pat. No. 8,665,087, and a continuation of application No. 10/943,323, filed on Sep. 17, 2004, now Pat. No. 7,508,840.

(60) Provisional application No. 60/575,774, filed on May 28, 2004, provisional application No. 60/626,570, filed on Nov. 10, 2004.

(51) Int. Cl.
*H04L 12/28* (2006.01)

(52) U.S. Cl.
USPC ........... 370/406; 370/319; 370/330; 370/337; 370/436; 370/466; 340/539.1; 340/905; 340/990; 455/78; 455/404.1

(58) Field of Classification Search
USPC ......... 370/319, 320, 330, 335, 337, 406, 436, 370/466; 455/78, 404.1; 340/539, 905, 990
See application file for complete search history.

(56) References Cited

U.S. PATENT DOCUMENTS

| 4,905,302 | A | * | 2/1990 | Childress et al. ............. 455/515 |
| 4,939,746 | A | * | 7/1990 | Childress ...................... 455/509 |
| 5,239,670 | A | * | 8/1993 | Schwendeman et al. ...... 340/7.2 |
| 5,852,721 | A | * | 12/1998 | Dillon et al. .................. 709/217 |
| 6,084,510 | A | * | 7/2000 | Lemelson et al. ....... 340/539.13 |

(Continued)

OTHER PUBLICATIONS

U.S. Appl. No. 10/585,148, filed Nov. 20, 2004.

(Continued)

*Primary Examiner* — Andrew Lai
*Assistant Examiner* — Andrew C Lee
(74) *Attorney, Agent, or Firm* — Daniel J. Long

(57) ABSTRACT

A system for providing situational awareness outside a temporary incident area network includes a prioritized connection module for connecting a mesh network at the incident area to one of a plurality of available communications channels, with the selection based not only on the availability of a communications channel but also on the associated expense, speed, reliability or bandwidth, so that high bandwidth traffic such as video and pictures can be reliably sent from the incident area to a location outside of the incident area. In one embodiment switching to a satellite phone network bypasses problems with terrestrial networks such as cell phone networks and landlines which may be down.

17 Claims, 2 Drawing Sheets

(56) References Cited

U.S. PATENT DOCUMENTS

| | | | |
|---|---|---|---|
| 6,141,531 A * | 10/2000 | Williams et al. | 455/7 |
| 6,160,837 A * | 12/2000 | Bruno et al. | 375/130 |
| 6,188,902 B1 * | 2/2001 | Yamada | 455/445 |
| 6,198,931 B1 * | 3/2001 | Smith et al. | 455/445 |
| 6,223,053 B1 * | 4/2001 | Friedmann et al. | 455/552.1 |
| 6,233,445 B1 * | 5/2001 | Boltz et al. | 455/404.2 |
| 6,272,343 B1 * | 8/2001 | Pon et al. | 455/434 |
| 6,338,087 B1 * | 1/2002 | Okanoue | 709/222 |
| 6,385,302 B1 * | 5/2002 | Antonucci et al. | 379/45 |
| 6,389,287 B1 * | 5/2002 | Smith et al. | 455/445 |
| 6,407,998 B1 * | 6/2002 | Polit et al. | 370/365 |
| 6,496,949 B1 * | 12/2002 | Kanevsky et al. | 714/47.1 |
| 6,574,561 B2 * | 6/2003 | Alexander et al. | 702/5 |
| 6,606,499 B1 * | 8/2003 | Verrier et al. | 455/452.1 |
| 6,711,399 B1 * | 3/2004 | Granier | 455/404.1 |
| 6,775,235 B2 * | 8/2004 | Datta et al. | 370/238 |
| 6,799,031 B1 * | 9/2004 | Lewiner et al. | 455/404.1 |
| 6,895,329 B1 * | 5/2005 | Wolfson | 701/410 |
| 6,925,302 B2 * | 8/2005 | Kojima et al. | 455/435.3 |
| 7,068,760 B2 * | 6/2006 | Binning | 379/45 |
| 7,091,851 B2 * | 8/2006 | Mason et al. | 340/539.13 |
| 7,091,852 B2 * | 8/2006 | Mason et al. | 340/539.13 |
| 7,119,676 B1 * | 10/2006 | Silverstrim et al. | 340/531 |
| 7,177,623 B2 * | 2/2007 | Baldwin | 455/404.2 |
| 7,212,506 B2 * | 5/2007 | Varney et | 370/329 |
| 7,233,781 B2 * | 6/2007 | Hunter et al. | 455/404.1 |
| 7,245,216 B2 * | 7/2007 | Burkley et al. | 340/539.13 |
| 7,263,063 B2 * | 8/2007 | Sastry et al. | 370/235 |
| 7,263,073 B2 * | 8/2007 | Petite et al. | 370/278 |
| 7,271,704 B2 * | 9/2007 | McSheffrey et al. | 340/286.05 |
| 7,321,383 B2 * | 1/2008 | Monagahn et al. | 348/14.02 |
| 7,505,778 B2 * | 3/2009 | Tchan et al. | 455/518 |
| 7,554,982 B2 * | 6/2009 | Nakamura et al. | 370/392 |
| 7,567,174 B2 * | 7/2009 | Woodard et al. | 340/539.26 |
| 7,593,321 B2 * | 9/2009 | Galand et al. | 370/218 |
| 7,633,387 B2 * | 12/2009 | Carmichael et al. | 340/539.13 |
| 7,646,854 B2 * | 1/2010 | Anderson | 379/45 |
| 7,742,436 B2 * | 6/2010 | Carrillo et al. | 370/255 |
| 7,765,303 B2 * | 7/2010 | Geoffrion | 709/227 |
| 7,787,492 B2 * | 8/2010 | Timus et al. | 370/468 |
| 7,797,459 B1 * | 9/2010 | Roy et al. | 709/249 |
| 7,817,982 B1 * | 10/2010 | Chu et al. | 455/404.1 |
| 8,311,006 B2 * | 11/2012 | Agarwal | 370/329 |
| 2003/0018573 A1 * | 1/2003 | Comas et al. | 705/38 |
| 2003/0043773 A1 * | 3/2003 | Chang | 370/338 |
| 2004/0023635 A1 * | 2/2004 | Impson et al. | 455/404.1 |
| 2004/0023658 A1 * | 2/2004 | Karabinis et al. | 455/447 |
| 2004/0070515 A1 * | 4/2004 | Burkley et al. | 340/825.49 |
| 2004/0116134 A1 * | 6/2004 | Maeda et al. | 455/457 |
| 2004/0192353 A1 * | 9/2004 | Mason et al. | 455/457 |
| 2004/0218609 A1 * | 11/2004 | Foster et al. | 370/401 |
| 2004/0235468 A1 * | 11/2004 | Luebke et al. | 455/426.1 |
| 2005/0001720 A1 * | 1/2005 | Mason et al. | 340/539.13 |
| 2005/0006109 A1 * | 1/2005 | McSheffrey et al. | 169/75 |
| 2005/0066052 A1 * | 3/2005 | Gupta et al. | 709/238 |
| 2005/0219044 A1 * | 10/2005 | Douglass et al. | 340/506 |
| 2005/0221821 A1 * | 10/2005 | Sokola et al. | 455/432.3 |
| 2005/0222933 A1 * | 10/2005 | Wesby | 705/36 |
| 2005/0243835 A1 * | 11/2005 | Sharma et al. | 370/395.42 |
| 2005/0243973 A1 * | 11/2005 | Laliberte | 379/37 |
| 2005/0245232 A1 * | 11/2005 | Jakober et al. | 455/410 |
| 2005/0265326 A1 * | 12/2005 | Laliberte | 370/389 |
| 2006/0158329 A1 * | 7/2006 | Burkley et al. | 340/539.13 |
| 2007/0103292 A1 * | 5/2007 | Burkley et al. | 340/539.13 |
| 2007/0129053 A1 * | 6/2007 | Phillips et al. | 455/404.1 |
| 2007/0139191 A1 * | 6/2007 | Quatro | 340/539.13 |
| 2007/0217437 A1 * | 9/2007 | Forte | 370/401 |
| 2009/0143046 A1 * | 6/2009 | Smith | 455/404.1 |

OTHER PUBLICATIONS

U.S. Appl. No. 10/943,323, filed Sep. 17, 2004.
U.S. Appl. No. 60/626,570, filed Nov. 10, 2004.
U.S. Appl. No. 60/575,774, filed May 28, 2004.

\* cited by examiner

METHOD AND APPARATUS FOR PERSISTENT COMMUNICATIONS, INTEROPERABILITY AND SITUATIONAL AWARENESS IN THE AFTERMATH OF A DISASTER

RELATED APPLICATIONS

This Application claims rights under 35 USC §119(e) from U.S. application Ser. No. 10/585,148 filed Nov. 10, 2005, U.S. application Ser. No. 10/943,323, filed Sep. 17, 2004, U.S. Application Ser. No. 60/626,570 filed Nov. 10, 2004, and Ser. No. 60/575,774 filed May 28, 2004, the contents of which are incorporated herein by reference.

FIELD OF INVENTION

This invention relates to interoperable communications in the aftermath of disaster and more particularly to the provision of persistent communications when traditional communication links are down.

BACKGROUND OF THE INVENTION

As exemplified by the response to hurricane Katrina, one of the major downfalls of the response to the disaster was the inability of various rescue units to be able to communicate with each other due to differing equipment, differing frequencies, differing modulation modes and differing data inputs, making communication amongst operational units or the first responders exceedingly difficult if not outright impossible.

As described in U.S. patent application Ser. No. 10/943, 232 an adhoc emergency interoperability communication network is established by providing universal temporary incident area network modules that communicate with each other on a network using a common frequency and modulation format, such as provided by 802.11. In one embodiment of the system, the adhoc network is established when vehicles containing the temporary incident area network modules are within range of each other. The temporary incident area network modules are such as to have an RF or other connection with handheld or in vehicle communication devices of whatever variety that have standardized voice, data and push-to-talk channels. Upon receipt of a transmission from the standard transceiver, the signals are converted to the common network frequency and format and transmitted around the network. The system thus allows communications amongst the responders to an incident without having to set up pre-arranged protocols, equipment compatibility, or equipment addressing. Moreover, command and control structure can be achieved through a commander having access through his own temporary incident area network module at a node on the network to be able to route and control the flow of information over the network. This network is referred to herein as a mesh network.

The problem however occurs when those within the temporary incident area network cannot communicate outside of the network. Thus, the ability to obtain material and personnel from locations outside the temporary incident area network are severely limited in the case where towers are down, where there are no base stations in the area and where there is no power available to sustain radio communications. Thus, it is impossible for those within the temporary incident area network to communicate outside the network. As a result, their needs and requirements are not communicated to the outside world.

As in hurricane Katrina, when people are stranded because they don't have communications or when supplies exist but requirement for them is unknown, it is important to be able to communicate data back to a location where an entity can use that information to make decisions and provide the requisite aid.

In hurricane Katrina, almost all of the cell towers were down because of lack of emergency generators or where batteries finally failed. Also there was no proximity of wi-fi hotspots with which those having power to their computers could communicate. Moreover, point-to-point communications from the modules was limited in range to, for instance one or two miles so that assistance outside the temporary incident area network could not be made available.

In short, better information would have been an optimal weapon, with information being sent to the right people at the right place at the right time. In order to provide an optimal response, it is important that information be moved within agencies, cross departments and between jurisdictions of the government, seamlessly, securely and efficiently.

As documented in the "A Failure of Initiative" report drafted by the U.S. House of Representatives after hurricane Katrina, large scale catastrophes can overwhelm and temporarily disable communication systems, affecting first responders' abilities to make and execute critical decisions. While the aforementioned interoperability system provides a proven wireless network solution that operates completely independent of existing communications infrastructure to provide voice interoperability, there is a necessity to expand the reach of such a system to those beyond the temporary incident area network.

As will be appreciated, the aforementioned interoperability system provides immediate voice interoperability, a critical need to ensure successful command and control at a disaster. The nodes in the system allow for flexibility and adaptability as the disaster response grows. However, voice operability requires an expanded capability to first responders so as to not only provide voice interoperability among disparate radio types and frequencies and a secure transmission over a mesh network, connectivity needs to be provided outside the affected region both incoming and out going. This connectivity needs to include not only voice, but also data and internet access. Moreover, situational awareness capabilities need to be provided to the outside world using GPS and GIS mapping data. It is also desirable to provide video and data sharing to those outside the mesh network, as well as automated wide area network management. Also, when data includes wireless RF identification technology for patient triaging, the information must be transmitted beyond the mesh network. Key to all of the above is to be able to provide sustained system runtimes via power sources from common devices.

It is to be noted that incident commanders do not have the time to worry about technical issues concerning mesh networks, specifically bandwidth saturation. Aided by GPS location of apparatus and access point configuration settings, it is important to provide a system to provide automatic dynamic reconfiguration of access point channel allocation. This automatic system requires that there is no interaction on behalf of first responders to maintain network integrity.

In short, there needs to be connectivity with the internet and other communications networks when wi-fi channels do not exist, where landlines are inoperative, where 900 megahertz communication is out of range and when cellular communication is not possible, either due to lack of working towers or lack of cellular coverage.

SUMMARY OF THE INVENTION

In order to provide communication or connectivity outside of the temporary incident area network, a prioritized connection module is connected to a node of the network which assesses the connectivity to the internet based on available wi-fi, landline, 900 megahertz, cellular and SATphone availability. Based on a requirement to communicate with the outside world, the prioritized connection module first ascertains what communication channels are available and then selects the most robust communication channel and connects to it, such that the temporary incident area network is connected through prioritized connection module to the available communications channel that is up and running. Due to the cost of various of the communications channels, it is part of the subject invention that the prioritized connection module ascertains the least expensive, reliable communication channel available to the temporary incident area network.

In one embodiment, the prioritized connection module may be provided using the pTerex mobile Tactical Edge Network (MTEN) product that automatically detects and connects to any available uplink source such as Ethernet, serial, wireless, cellular or satellite services, and provides connectivity beyond the affected region. If an uplink source fails, then the mobile tactical edge network switches to the next best active connection, ensuring constant communication.

Moreover, the temporary incident area network is provided with modules to provide not only voice communication but also video and data, with wireless RFID technology providing first responders with medical data to track and monitor patient status locally with the data being communicated to the incident commander and surrounding hospitals. Moreover, an airwave management platform is provided as a network management tool to allow for the ability to monitor and configure wireless networks. This performs critical management tasks including device recovery, configuration management, monitoring, alerting and diagnostics by providing prioritization and control of the mesh network at the incident scene.

Moreover, since power grids and radio communications infrastructure may be damaged and unavailable, providing long term power to the modules associated with the temporary incident area network is extremely important. The subject system therefore incorporates automatic power management features and provides access to alternative power sources such as portable gas generators, existing wall sockets, vehicle cigarette lighters, portable power sources, batteries from abandoned vehicles and alternative energy sources.

In summary, a prioritized connection module provides bi-directional connectivity outside the mesh network over available communication channels, in which the availability of a communication channel is sensed and in which the temporary incident area network is coupled to the available channel in a prioritized fashion.

BRIEF DESCRIPTION OF THE DRAWINGS

These and other features of the subject invention will be better understood in connection with the Detailed Description and in conjunction with the Drawings of which.

DETAILED DESCRIPTION

Figure 1:
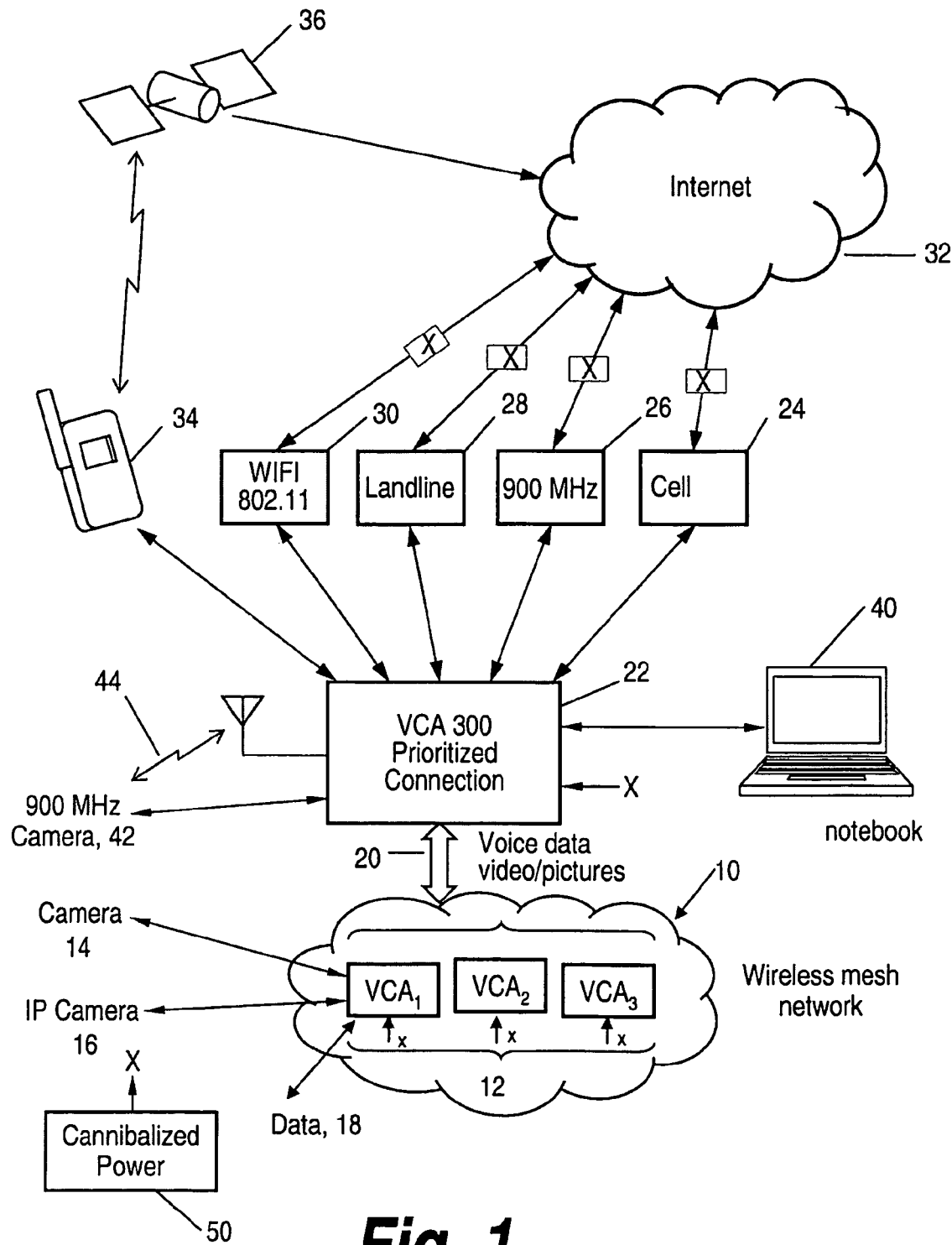
FIG. 1 is a diagrammatic illustration of the subject fail safe communications system involving the use of a prioritized connection module.

The following hypothetical disaster is used to describe how temporary incident area network modules and systems are to be augmented.

Considering for the moment a scenario in which a casino is bombed in a terrorist attack. Communication infrastructures are destroyed. After seeing smoke, not being dispatched and knowing a catastrophic event has just occurred, local emergency personnel respond. Upon approaching the scene, the first responders establish a hot zone perimeter, knowing that the area could be contaminated by hazardous material. Due to road destruction in the immediate area, three separate fire department officers start establishing command posts. Utilizing the above mentioned system, each commander establishes a bi-directional link to dispatch and provide interoperability between each command post. Additional resources are requested to the scene, including National Guard, hazardous material teams, USART teams, ambulances from the tri-state area and military resources. The senior officer of the three command posts assumes overall incident command.

As local towns provide emergency responders including fire, law enforcement, emergency management and EMS personnel, the interoperability system provides interoperability across all frequencies. Using the NIMS structure, staff positions are assigned. Talk group software is utilized to isolate communications between sectors. Staging officers are placed on each access road to coordinate incoming responders. Using GPS/GIS mapping capabilities, the local incident commander directs law enforcement vehicles around the incident to establish a complete wireless mesh network so that all scene personnel are now connected to the mesh network to communicate. As noted above, the mesh network is the temporary incident area network described in the patent application Ser. No. 10/943,323.

Bi-directional link capabilities are reserved for passing situational awareness data and communicating with off-scene assets. As each unit arrives on scene, a database is populated in terms of frequency, apparatus type, man power, pump and water capability, which can be utilized by all staff officers to allocate resources.

Walking wounded arrive at the edges of the hot zone. Proper de-contamination stations are established and patients are tagged using the subject system. All patient information is passed via the mesh network to populate a database with appropriate information including triage level, name of a patient and location. The medical officer establishes communications with local hospitals via the subject system and transmits patient data and coordinates transport based upon hospital feedback. This database, accessible by external command and control personnel, remains updated with patient information for contacting families of deceased and injured.

The incident commander uses the subject system to uplink critical information to an off-scene command post. Upon arrival at the scene, the state hazmat team automatically enters the mesh zone and has access to this information via laptop. The hazmat team enters the hot zone equipped with video cameras, air quality testing and chemical analysis equipment. All the data from this equipment is relayed back to the incident commander via the mesh network and is passed on to the command post established outside the affected region.

Central to this capability, is the capability to communicate with the command post outside the affected region.

The modules associated with the temporary incident area network are provided with vehicle chassis assemblies (VCA) that are poled for RF energy, GPS location and access point configuration. The bandwidth is continually monitored and the access point configurations are dynamically changed to ensure the health of the mesh network, with automatic networks management being transparent to the incident commander.

As National Guard and military resources arrive on scene, unified command structure is established. MERS vehicles with onboard communication systems arrive on scene. As these vehicles arrive on-scene they start to assume responsibility for voice interoperability. Because of the magnitude of the response, all frequencies are not able to be patched together by the MERS vehicles. However, the subject system continues to provide integrated voice interoperability and talk groups are established to eliminate interference between the two communications interoperability solutions. Situational awareness continues to be provided by the subject system through its mesh network, which is passed into the MERS vehicle network.

Throughout the response of this disaster, the subject system contemplates utilizing alternate power sources while apparatus awaits refueling from incoming fuel tanks. The mesh network retains its integrity for the entire relief and reconstruction efforts of critical infrastructure. As federal and state resources are secured, voice interoperability is provided by the subject system to remaining first responders until such time as the emergency response is complete.

Having described the above scenario, it is incumbent upon the subject system to provide connectivity between the mesh network or temporary incident area network and the internet and other communications channels to establish communications with regions beyond the affected area. The connectivity is provided through a prioritized connection which couples voice and data as well as video and pictures from the mesh network, either through the internet or to other communication facilities, to sites outside the immediate incident area. This is done by sensing what communication channels are available and then switching the voice, data, video or pictures from the incident area network to the available communications channel.

It is part and parcel of the subject invention that the prioritized connection module be able to sense what channels are down and what channels are up; and then automatically route communications from the incident area network to locations outside of the incident area network location, most notably by accessing the internet and addressing communications to the appropriate server.

With all cell towers down due to power failures or with wireless coverage limited, as a last resort, the prioritized connection modules connect the communications from the incident area network to a SAT phone for relay by satellite to the internet, and thus to the intended off-scene destination.

As will be appreciated, the subject system is exceptionally useful when technological complexity renders the communication usable by responders during a crisis. Moreover, the subject system solves the challenge of automated realtime bandwidth management and can be used to develop an integrated fuel/power management scheme to conserve precious resources. Moreover, the dependence on cellular networks which may lack power or sufficient bandwidth of an event may be bypassed.

Additionally, dependence on radio tower infrastructure is avoided by a system which operates independently from existing infrastructure.

It is also noted that expansion of a small incident network to wide area disaster response can result in unacceptable network performance. This is solved by the subject system by intelligently selecting communications channels that can handle the increased load.

Finally, the subject system permits integration of high volume 802.11 wireless data traffic into existing mesh networks without degrading realtime voice communications.

More particularly and referring now to FIG. 1, a temporary area incident network 10 involving a wireless mesh network is populated in one embodiment with vehicle chassis assemblies 12, here labeled $VCA_1$, $VCA_2$, and $VCA_3$ which refers not only to the modular communication units in a vehicle but also to handheld units. As illustrated, various other inputs to the VCAs, other than voice communications, can be for instance those from a traditional camera 14 or can be from an IP camera 16. Also as illustrated at 18, data of any type, be it from sensors and the like, may be inputted to a vehicle chassis assembly, via wired or wireless connection, with the result being that voice data, video or pictures as illustrated by double-ended arrow 20 may be coupled to a prioritized connection module 22, herein labeled VCA300.

It is the purpose of this prioritized connection module to sense which of a number of communications channels is available and to steer the data from the wireless mesh network at the incident area to one or more of the available communications channels.

In one embodiment these communications channels include a cell phone channel at 24, a 900 megahertz channel at 26, a landline channel at 28 and a WIFI 802.11 channel 30. All of channels 24-30 may be connected to the internet 32 which communicates information from the incident area to the outside world.

Also indicated is a satellite phone 34 which communicates with a satellite 36 that downloads and uploads data to internet 32, such that data derived from the incident area is available or to other networks outside the incident area.

As illustrated, not only can voice data and pictures and the like be communicated from the vehicle chassis assemblies, digital data can be coupled to and from the prioritized connection module 22. As a result, laptop 40 and camera 42 may be coupled to the prioritized connection modules and through a wireless connection as illustrated by double-ended arrow 44. In one embodiment this connection may be a 900 megahertz connection.

In one embodiment, all of the VCAs are linked to the prioritized connection module via an RF link as mentioned above. Also, other data can be wirelessly linked to the prioritized connection module 22.

In operation, it is the function of the prioritized connection module 22 to sense which of the communications channels 24-30 are open, and moreover to ascertain the cost of communicating over a particular open channel. The purpose of the prioritized connection in this case is to establish which of the open communication channels is available and to make the connection to that communications channel which is the least expensive. Alternatively, the connection can be made to the channel that is the most robust.

Assuming that for instance landlines are down, that the cell phone towers are without power and therefore down, that 900 megahertz communication is impossible due to range constants and that the WIFI connection is either inoperative or out of range, then the prioritized connection module 22 connects the voice data, video or pictures to the satellite communications channel through satellite phone 34.

What will be appreciated is that when all else fails, while the satellite communications channel is potentially the most expensive, it can be used to provide information about the incident scene to those not within the incident area.

Oftentimes in a disaster and as mentioned before, most if not all communications channels will be down and critical information cannot be transmitted from the wireless mesh network to for instance facilities outside of the immediate area.

The subject system is a fail-safe system which ensures that critical information is transmittable outside of the wireless mesh network over the least expensive channel in one embodiment, or over the most robust channel in another embodiment.

As mentioned above, it is often the case that power to the units associated with the wireless mesh network is not available. For the most part these units are battery-powered and the longevity of the batteries associated with these units is somewhat limited.

It has been found that when arriving at a incident scene, power can be cannibalized for instance by attaching jumper cables to batteries in cars that may be in the area. This is referred to herein as cannibalized power and is illustrated at 50. This power can also come for instance from generators that are usable at the scene, or may be derived from those power lines that are still up and running.

Thus, one of the purposes of the subject invention is to be able to cannibalize power wherever it is available within the incident area and to power the modules associated with the wireless mesh network or the prioritized connection module, so that critical information from the incident scene can be transmitted to authorities removed from the scene.

While it has been found in recent disaster relief efforts that landlines are down and that WIFI connections and 900 megahertz connections do not have sufficient range; and further that cell towers may be down for lack of power, the only reliable communications is via satellite communications which does not require the aforementioned infrastructure to be in place and working. Thus, the prioritized connection module as a backstop can channel the communications to a SATphone which can relay the information through the associated satellite to incident commanders that are not within the incident area.

What is now described is the operation of the prioritized connection module 22.

Figure 2:
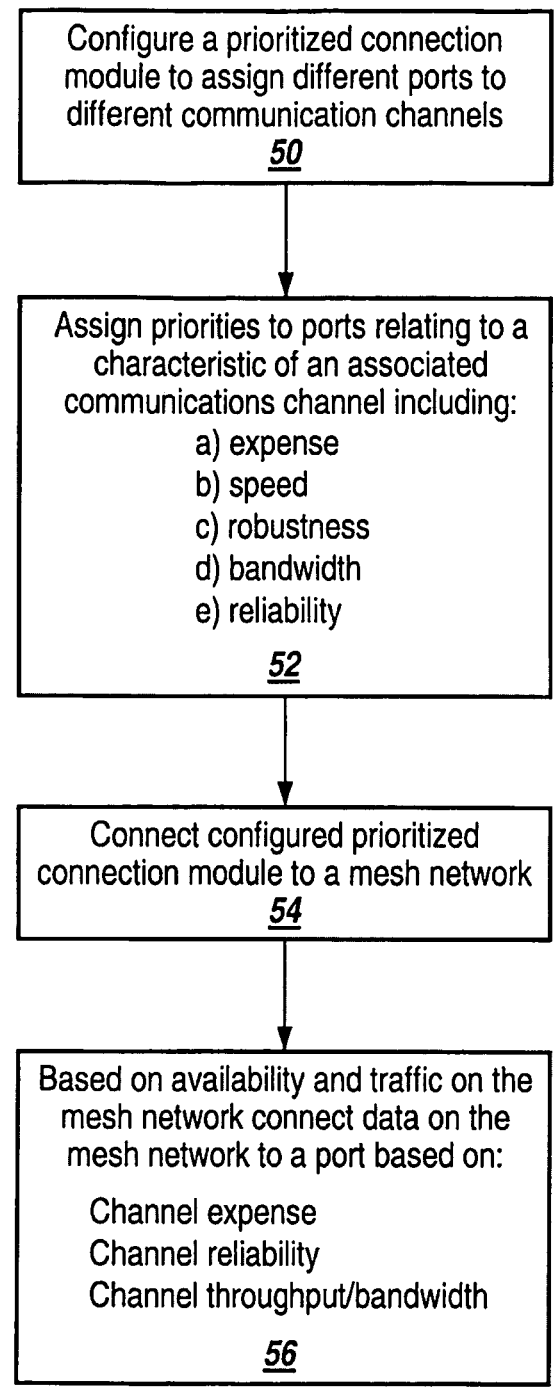
FIG. 2 is a flow chart for the operation of the prioritized connection module of FIG. 1.

Referring now to FIG. 2, it is the purpose of the subject invention to take a commercial off-the-shelf module which routes information and data to one of a number of communications channels and to provide that device with a prioritization schedule so that the module not only detects when a communications channel is available but also routes the information from a wireless mesh network to a desired communications channel based on a prioritization scheme.

As can be seen in FIG. 2, the first step is to configure a prioritized connection module to assign different ports to different communications channels. These channels could for instance be a cell phone channel, a 900 megahertz channel, a landline channel, a WIFI channel or a satellite phone channel.

When all else false in terms of terrestrial communications such as WIFI, landline, 900 megahertz and cell phone communications, it is desirable to be able to take the data off the wireless mesh network and port it directly to a satellite phone network so that situational awareness can be made available to those outside the incident area regardless of the inoperable terrestrial equipment. The connection from the prioritized connection module through the satellite telephone and the satellite network to the internet permits instant communications, both in downloading and uploading information from the wireless mesh network to a point or position remote from the incident area.

As can be seen at 52, one can assign priorities to the ports relating to a characteristic of an associated communications channel which characteristics include for instance the expense involved in utilizing the channel, the speed of the channel, the robustness of the channel, the bandwidth of the channel or the reliability of the channel.

It is well understood that satellite communications is the most expensive method of communication and due to limited budgets it is useful that one can ascertain which of the terrestrial based communications channels are available and the cost thereof so that the data on the wireless mesh network may be ported to the least expensive yet reliable communications channel, exclusive of satellite communications.

As can be seen at 54, one connects the prioritized connection module to a mesh network and then as shown at 56 based on availability and traffic on the mesh network one connects the data on the mesh network to a port based on channel expense, channel reliability or channel throughput/bandwidth.

In order to be able to make these selections it is important to be able to know the traffic that exists on the wireless mesh network so that for instance high bandwidth communications such as video and pictures can be routed to a communications channel that has the required bandwidth as well as reliability. Voice on the other hand occupies less bandwidth as do some data communications generated on seen as for instance by a notebook or other computer device at the incident area scene.

Thus, while commercially available routers do in fact detect availability of communications channels, it is a property of the subject invention to be able to select from the available channels a channel which is most suitable. The most suitable channel can in some instances be the least expensive channel or can for instance be the channel that is most robust or reliable. When all else fails, meaning that the terrestrially-based systems are all out, one can route the information from the wireless mesh network to the satellite phone which does not rely on terrestrially-based equipment to provide conductivity.

As a result of the utilization of the prioritized connection module one can create situational awareness not only in terms of voice but also in terms of high bandwidth video, picture and sensor data that is available by the interoperable modules that operate on the wireless mesh network, but also can be obtained by directly coupling video, picture or sensor data to the prioritized connection module itself.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A system for providing situational awareness involving communication systems which are taken down by a catastrophic incident in which the catastrophic incident occurs at an incident area involving a scene in which an incident is taking place, herein, after the catastrophic incident, an interoperable temporary incident area network modules on a wireless mesh network are used to provide communication between said incident area network modules in the incident area, comprising:

a connection module coupled to said wireless mesh network for connecting information communicating by said wireless mesh network to network nodes at locations outside of said incident area, said connection based on detecting inoperability of a communication link impacted by the catastrophic incident to handle all traffic, said connection module including a switching system for connecting said information to an operable communications channel link between said mesh network and said network nodes at locations outside said incident area, selecting an operable communication link being based on the availability of an operational channel link with sufficient bandwidth in view of said catastrophic incident.

2. The system of claim 1, wherein said connection module includes a number of ports, one each dedicated to a different commercial, military or private channel and in which said switching system switches said information to one of said communications channels by use of connection to the internet based on sufficiency of a communication link to handle all traffic.

3. The system of claim 1, wherein at least one of voice communication, video images, pictures, graphics, signal data and sensor data and any combination thereof is transmitted from said wireless mesh network to said connection module by selecting a communication channel from said plurality of communications channels.

4. The system of claim 1, wherein said wireless mesh network includes an emergency power transfer unit at a module for cannibalizing power available at said incident area to power a number of interoperable communication modules and said connection module that are battery-operated, whereby situational awareness is achieved in spite of battery life.

5. The system of claim 1, wherein said connection module functions to import and export data to and from said incident area scene between said incident area scene and locations outside of said incident area scene by use of connection to the internet based on sufficiency of said communication link to handle all traffic, thereby to provide situational awareness to individuals or systems remote from said incident scene.

6. The system of claim 1, wherein said connection module detects the availability of said communications channels and transmits information to outside world by selecting said operable channel from said plurality of communications channels.

7. The system of claim 6, wherein said communications channels include one of a WIFI network, a landline network, a 900 megahertz network, a cell phone network, and a satellite phone network or any other communications medium capable of transmitting digital data such that at least one of said communications channels exists for transmitting information to outside world.

8. The system of claim 7, wherein said communications channels include a satellite communications network and wherein said satellite communications network is selected from said plurality of communications channels to obviate problems with terrestrial communications systems impacted by said catastrophic incident.

9. The system of claim 7, wherein said connection module selects an operable communications channel that is least expensive.

10. The system of claim 7, wherein said connection module prioritize said plurality of communications channels that are available and most reliable connection characteristic based on transmission information.

11. The system of claim 7, wherein said connection module selects the available communications channel having the most reliable connection characteristic.

12. A method for establishing situational awareness outside a wireless mesh network at the area of an incident in which there is a catastrophic interruption of communication due to communication links going down as a result of the catastrophic incident, said method comprising the steps of:
   selecting a channel link from a plurality of different communications channel links between the wireless mesh network and a network node outside the area of the incident, said selected channel link being detected to be operable after the catastrophic incident to handle all traffic with a predetermined capacity and reliability; and,
   switching data, from the wireless mesh network over a connection using said selected communications channel link operable after the catastrophic interruption to a network node outside the area of the incident based on channel link operability to handle all traffic, and further based on at least one of communication channel cost, speed, robustness, bandwidth or reliability, data at the network node outside the area of the incident being coupled to the internet.

13. The method of claim 12, and further including making the connection based on traffic on the mesh network by selecting a channel link from a plurality of available communications channels that are prioritized.

14. The method of claim 12, and further including transmitting at least one of video information, picture information, voice information, data or sensor information from said wireless mesh network to said connection module by selecting an operable communication channel from the plurality of communications channels.

15. The method of claim 12, when at least one of the interoperable communication modules is battery operated and further including cannibalizing power at the incident area to power the battery-powered interoperable communication module, whereby situational awareness is achieved in spite of battery life.

16. A system after the occurrence of a catastrophic incident resulting in down communication links for providing situational awareness from an incident area based on communication between interoperable communications modules on a wireless mesh network, comprising:
   a channel availability determining unit connected between said wireless mesh network and a network node outside said incident area for determining after said catastrophic incident the availability of a terrestrially-based communication channel to connect all the data on said wireless mesh network to said network node outside said incident area; and,
   a connection module for switching information from said wireless network to a satellite phone system coupled to said network node outside said incident area in the determined absence of operability of a terrestrially-based communication channel to connect all data, whereby said satellite phone system is operable to import and export data from and to said wireless mesh network at said incident area to and from a location remote to said incident area, wherein said terrestrially-based communication channel and said satellite phone system are prioritized based on cost of communication, and wherein communications are switched to said satellite phone system based on said cost of communication thus to provide cost effective situational awareness outside of said incident area.

17. The system of claim 16, wherein where terrestrially-based communications channels are operable, said terrestrially-based communications channels are evaluated based on cost of communication therethrough; and whereby said connection module selects a communication channel from said plurality of communications channels other than that provided by said satellite phone and based on cost considerations related to a communication channel.

* * * * *